Figure 1:
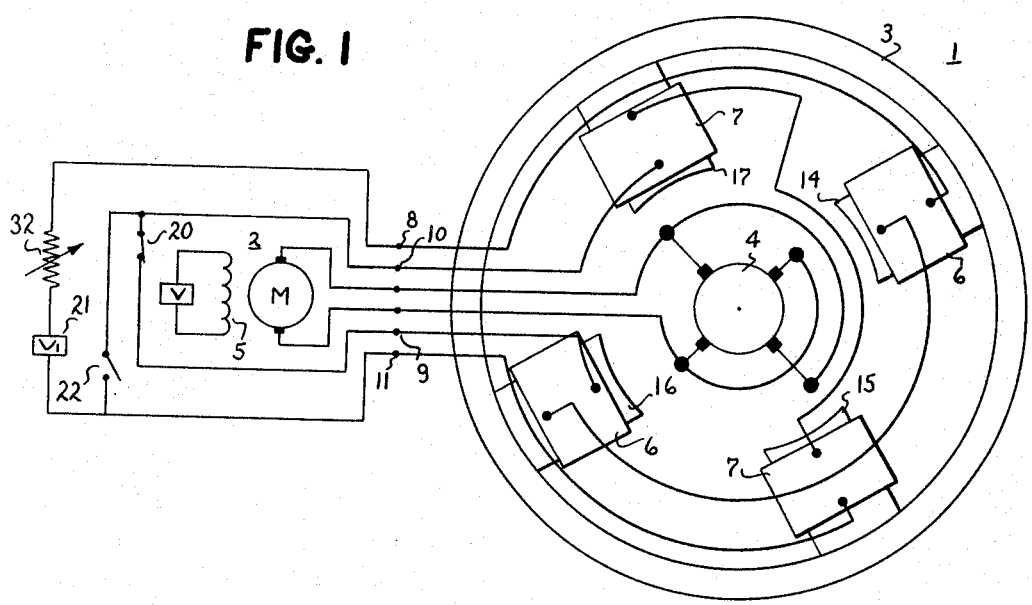

April 25, 1967 M. A. BAKER 3,316,480

SYSTEM FOR CONTROLLING THE TIME CONSTANT OF A SHUNT FIELD

Original Filed June 13, 1963

INVENTOR.
MARVIN A. BAKER
BY
HIS ATTORNEY

United States Patent Office 3,316,480
Patented Apr. 25, 1967

3,316,480
SYSTEM FOR CONTROLLING THE TIME
CONSTANT OF A SHUNT FIELD
Marvin A. Baker, Erie, Pa., assignor to General Electric
Company, a corporation of New York
Continuation of application Ser. No. 287,691, June 13,
1963. This application Sept. 23, 1966, Ser. No. 581,657
6 Claims. (Cl. 322—83)

This application is a continuation of application Ser. No. 287,691, now abandoned.

This invention relates to control systems and more particularly to an improved arrangement for controlling the time constant of the shunt field of a dynamoelectric machine. Although this invention has a wide range of applications, it is of particular advantage in controlling the time constant of the generator shunt field in motor control systems and will be particularly described in that connection.

In the variable, or adjustable, voltage motor control systems, the armature of a generator is connected in a closed loop with the armature of a motor. Motor speed control is obtained by controlling the generator field excitation. In such a system, rapid response of the generator output to changes in generator field excitation may result in a too rapid increase or decrease in the voltage supplied to the motor. The effects of such rapid increases or decreases in motor supply voltage have long been well known in the art. Consequently, it has been known in the prior art to provide additional windings on the field poles of the generator, short circuited through a resistance, to retard the variation in the field flux; the amount of retardation being determined by the resistance of the short circuit. Since such prior art means, however, require additional windings on the generator field pole which contributes to an increase in both the cost and the size of the generator, they have not been entirely satisfactory for many applications.

It is an object of this invention, therefore, to provide an arrangement for controlling the time constant of the shunt field of a dynamoelectric machine which overcomes one or more of the limitations of the prior art arrangements and which is simple and inexpensive.

I have discovered that since there are applications where it is desired to control the time constant of the shunt field of a dynamoelectric machine only when low shunt field excitation is required, as for example control of the field time constant of the generator in an elevator drive system, I can provide the desired control in a new, improved and inexpensive manner by utilizing only a portion of the shunt field winding to provide the required machine excitation and the other portion of the shunt field winding to inhibit the time rate change of flux.

Briefly stated, in accordance with one aspect of this invention, the control arrangement comprises means for connecting the shunt field winding of the dynamoelectric machine so that for a first operating range of the system all of the shunt field winding contributes to the excitation of the machine. The arrangement further includes means operative to load a portion of the shunt field winding at a second operating range of the system so that the unloaded portion produces the machine excitation and the loaded portion inhibits the time rate change of flux and thereby controls the time constant of the machine field.

In another more specific aspect of this invention, the control arrangement comprises a dynamoelectric machine having first and second shunt field windings. Means are provided which are adapted to connect the first and second field windings in circuit with a source of excitation voltage so that both of the field windings contribute to the excitation of the machine. Means are further provided for inhibiting the time rate change of flux in one of the shunt field windings by completion of a low impedance path shunting that winding to allow induced currents to flow in that winding in a direction to oppose any change in flux in the other field winding so that the time constant of the generator shunt field is increased.

Figure 2:
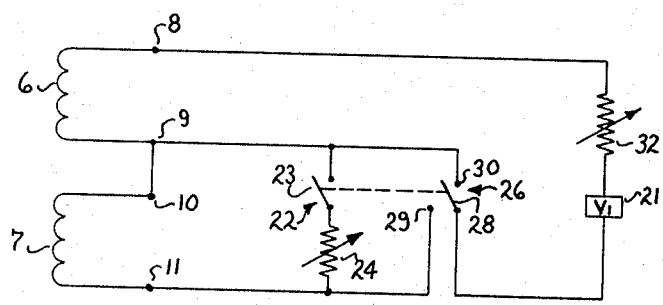

The novel features which are believed characteristic of this invention are set forth with particularly in the appended claims. My invention, itself, together with further objects and advantages thereof can best be understood by reference to the following description taken in connection with the accompanying drawing in which:

FIG. 1 is a partly diagrammatic, partly schematic simplified circuit diagram of a motor control system incorporating the principles of this invention;

FIG. 2 is a portion of the field circuit of a system similar to that of FIG. 1 illustrating a suitable connection for use when a resistance is employed in the shunt path of one of the generator shunt fields; and, FIGS. 3–6 illustrate different arrangements operative to provide loading of the selected portion of the shunt field winding of the dynamoelectric machine by means of a low impedance shunt path.

In FIG. 1 there is shown a simplified schematic circuit diagram of a motor control system wherein a generator, generally designated at 1, supplies energy to a motor 2 to control the speed thereof in well-known manner. As shown, generator 1 includes a field structure 3 and an armature 4. Armature 4 is connected to the armature of motor 2 which has a field winding 5 arranged to be connected to a suitable source of exciting voltage V.

Generator 1 may be of any known construction and is shown for simplicity as a four pole shunt field machine. It will be understood by those skilled in the art, however, that the generator will usually include commutating poles and may have a compounding, or series, winding. The present invention, however, is in no way limited by the general structure of the machine.

As shown in FIG. 1, generator 1 includes a first shunt field winding 6 and a second shunt field winding 7 terminating, respectively, in field leads 8–9 and 10–11. Preferably, to provide a balanced magnetic circuit, the shunt field windings are disposed symmetrically in the generator. Thus, for example, the coils of shunt field windings 6 and 7 may be placed on alternate field poles, as shown in FIG. 1, wherein the coils of shunt field winding 6 are placed on field poles 14 and 16 and the coils of shunt field winding 7 are placed on field poles 15 and 17. Alternatively, coils of both shunt field windings 6 and 7 may be placed on each of the field poles 14 to 17. Means, shown schematically as a switch 20, are adapted to connect the first and second shunt field windings, 6 and 7 respectively, in circuit with a suitable source of excitation voltage 21 so that both of the shunt field windings contribute to the excitation of the generator.

In FIG. 1, for simplicity, the switch 20 is shown adapted to connect shunt field windings 6 and 7 in series circuit relationship, however, as will be understood by those skilled in the art a parallel field connection may be utilized if desired. Means are further provided to load one of the field windings. To this end, means, shown schematically by the switch 22, may be actuated to complete a low impedance path shunting the field winding 7. When this low impedance path is a full short circuit such as is provided by actuation of the switch 22 in FIG. 1, a switch need not be employed to provide for the interconnection but instead field windings 6 and 7 may be connected together permanently.

For many applications it is desirable to provide some control of the impedance of the low impedance path since the impedance thereof, when the path is completed across the selected portion of the shunt field winding, determines the amount of inhibition of the time rate change of flux.

Since, ordinarily, it would be undesirable to include this impedance in the portion of the field winding not shunted by this low impedance path, means may be provided as shown in FIG. 2 for removing the excitation from the portion of the shunt field winding shunted by the low impedance path.

For example, the low impedance path in FIG. 2 is shown as the series combination of the switch 22 and the variable resistance 24 and means are provided for connecting the exciting voltage supply across both field windings 6 and 7 for one operating condition and across only the shunt field winding 6 for the other operating condition at which time the low impedance path shunting field winding 7 is also completed.

To this end, means are provided for connecting both shunt field windings 6 and 7 across the exciting voltage source 21 for a first operating range of the system so that both windings contribute to the excitation of the dynamoelectric machine while for a second operating range of the system only one of the shunt field windings is so connected to contribute to the excitation. For example, this may be provided, as shown schematically by the double throw switch 26. Thus, at one operating range when no control of the machine shunt field time constant is desired, switch arm 28 is moved to contact 29 to connect the exciting voltage across both of the series connected windings 6 and 7 so that both windings contribute to machine excitation. At another operating range, however, wherein it is desired to increase the time constant of the field, switch arm 28 is moved to contact 30 to connect the excitation voltage across only the shunt field winding 6. Switch arm 28 of the switch 26 may be ganged to switch arm 23 of switch 22, as shown, so that when the arm 28 is moved to the contact 30, switch arm 23 completes the low impedance path across the winding 7 while at the same time the excitation voltage has been removed from field winding 7 and applied only across field winding 6.

While the above arrangement has been described with reference to the use of a variable resistance in the shunt path, it would also be employed for the embodiments illustrated in FIGS. 3–6 wherein a rectifier, one or more controllable rectifiers, or a capacitance is included in the shunt path since the impedance of these elements would also ordinarily not wish to be included in the excitation portion of the field winding.

In the operation of the system of FIG. 1, the output voltage of generator 1 is controlled by varying the external resistance 32 in series with the shunt field windings of the generator. As is well known in the art, generators for operation over wide voltage ranges are usually separately excited, however, they may also be self-excited. As is apparent, this invention is applicable to either separately or self-excited dynamoelectric machines.

The time constant of the field circuit is the total inductance of the shunt field winding divided by the total resistance of the circuit. Consequently, when low excitations are required the value of the external resistance is large compared to the resistance of the shunt field winding so that the time constant of the circuit is reduced to a small value. In some applications, particularly elevator drives for example, the rapid response of the generator under these conditions is undesirable and causes operational difficulties.

In accordance with one aspect of this invention, one of the field windings is shunted by a low impedance path, for example a short circuit as illustrated in FIG. 1, during the operating range requiring low excitation and the other field winding is utilized to provide the excitation. Since there is a common magnetic coupling, the change of flux in the poles carrying the field windings shunted by the low impedance path causes a current to flow in those windings in a direction to oppose the change of flux and thus inhibit the time rate change of flux in the magnetic circuit. Only part of the original field windings are now used for excitation, however, so more current is required in those windings to produce a given value of flux. This reduces the value of the external resistance required and the time constant of the exciting portion of the field remains essentially the same as the time constant of the generator shunt field circuit when all of the windings were contributing to the excitation of the generator. Because the field windings shunted by the low impedance path, however, have induced currents flowing therein in a direction to oppose the change of flux, the net result is an inhibition in the time rate change of flux and therefore an increase in the time constant of the field circuit.

For some applications it is desirable to control the time constant of the generator field for only one polarity of flux change. Accordingly, in the embodiment shown in FIG. 3 the low impedance path shunting field winding 7 includes a rectifier 36 in addition to the switch 22 and if desired may also include the variable resistance 24.

Figure 3:
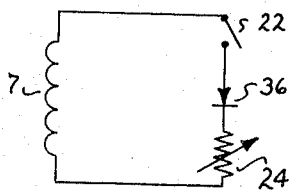
Figure 4:
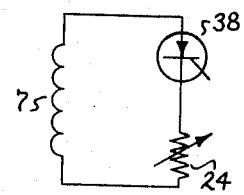

In FIG. 4 there is shown another embodiment similar to that of FIG. 3 but employing a controllable rectifier, such as the silicon controlled rectifier 38 poled to provide operation for one polarity of flux change. The low impedance path for the selected polarity is completed by rendering the controllable rectifier conductive by application of a suitable voltage to its control electrode in a manner well known in the art.

Figure 5:
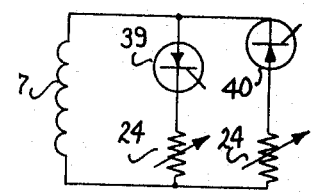

FIG. 5 illustrates the use of two controllable rectifiers 39 and 40 suitably poled as shown and rendered conductive to complete the low impedance shunt path.

Figure 6:
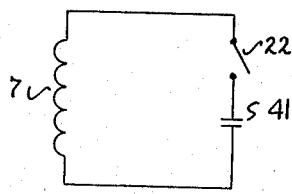

Similarly, FIG. 6 shows the use of a capacitance in the low impedance shunt path operative to load the field winding to inhibit the time rate change of flux in the manner described in detail hereinbefore.

It is to be understood that although I have shown particular embodiments of my invention, many modifications and changes may be made by those skilled in the art. For example, many variations of circuit elements with or without the use of additional adjustable resistance may be employed in the path shunting one of the field windings. Moreover, while for simplicity, the means for connecting the exciting voltage across the selected portions of the machine shunt field and for completing the low impedance path shunting the selected portion of the field have been illustrated as switches, other suitable means known in the art may be employed as well as the provision for either manual or automatic operation of such means. I intend, therefore, by the appended claims to cover all such changes and modifications as fall within the true spirit and scope of my invention.

What I claim as new and desire to secure by Letters Patent of the United States is:

1. A circuit for controlling the response time of a dynamoelectric machine to changes in the field excitation without the use of additional windings, comprising, in combination:
   (a) a dynamoelectric machine having field poles and a shunt field winding including a first portion and a second portion, wound on said field poles, each portion normally generating magnetic flux in the same direction so that both portions aid in the excitation of said machine;
   (b) switch means for the field circuit of said machine; said switch means having a first condition connecting said first portion and said second portion of said shunt field winding to a source of exciting voltage during a first operating range of said machine so that said first and second portions generate the magnetic flux providing the excitation of said machine, said switch means having a second condition connecting only said first portion of said shunt field winding to the source while disconnecting said second portion of said shunt winding from the source so that said second portion of said winding is responsive only to the excitation in said first winding portion to generate a magnetic force which inhibits the time rate of change of the flux of said first winding portion, said switch means being operative in said second condition to connect a low impedance path in parallel with said second portion of said winding.

2. The combination of claim 1 wherein said low impedance path includes a controllable rectifier operative to complete said path when rendered conductive.

3. The combination of claim 1 wherein said dynamo-electric machine is a direct current generator arranged to supply a variable voltage to a load by controlling the resistance in the field circuit of said generator.

4. The combination of claim 3 wherein said load is the armature circuit of a direct current motor.

5. The combination of claim 3 wherein said first and remaining portions of said shunt field winding are arranged symmetrically in the field structure of said generator.

6. The combination of claim 5 wherein means are provided for varying the impedance of said low impedance path.

References Cited by the Examiner

UNITED STATES PATENTS

| | | | |
|---|---|---|---|
| 873,778 | 12/1907 | Pauly | 318—141 |
| 1,657,239 | 1/1928 | Clymer | 318—141 |
| 2,781,486 | 2/1957 | Gilchrist | 322—68 X |
| 3,074,004 | 1/1963 | Schaeffer | 322—79 X |

MILTON O. HIRSHFIELD, *Primary Examiner.*

J. J. SWARTZ, *Assistant Examiner.*